United States Patent
Wright, Jr.

[11] 3,797,855
[45] Mar. 19, 1974

[54] BAG DEPLOYMENT

[75] Inventor: Hubert A. Wright, Jr., Lexington, Mass.

[73] Assignee: Allied Chemical Corporation, New York, N.Y.

[22] Filed: Apr. 10, 1972

[21] Appl. No.: 242,472

[52] U.S. Cl. ............ 280/150 AB, 9/11 A, 182/137, 182/138, 188/1 C
[51] Int. Cl. ............................................. B60r 21/08
[58] Field of Search .............. 280/150 AB; 188/1 C; 244/121; 182/137, 138, 139

[56] References Cited
UNITED STATES PATENTS

| 3,706,462 | 12/1972 | Lilly | 280/150 AB |
| 3,632,136 | 1/1972 | Foltz | 280/150 AB |
| 3,630,472 | 12/1971 | Axenborg | 280/150 B |
| 3,591,201 | 7/1971 | Brawn et al. | 280/150 AB |
| 3,550,957 | 12/1970 | Radke | 188/1 C |
| 3,444,962 | 5/1969 | Lech | 188/1 C |
| 2,165,274 | 7/1939 | Kessenich | 188/1 C |
| 3,638,755 | 2/1972 | Sack | 280/150 AB |
| 3,748,477 | 7/1973 | Wulbrecht | 280/150 AB |

Primary Examiner—Kenneth H. Betts
Assistant Examiner—John P. Silverstrim
Attorney, Agent, or Firm—E. D. Buff; J. Plant

[57] ABSTRACT

Folding of air bag or cushion restraint means so that the cushion fabric is deployed uniformly with a reduction in noise on deployment.

3 Claims, 3 Drawing Figures

PATENTED MAR 19 1974 3,797,855

ROLLED BAG

PREFERRED BAG PACKAGING

BAG DEPLOYMENT

This invention relates to folding and positioning before use of an energy-absorbing cushion or bag in a passenger restraint system. Particularly, the energy-absorbing cushion is positioned prior to inflation, and controlled during inflation so as to result in a uniform and orderly deployment of the cushion, which in turn results in a decrease in unpleasant or perhaps injurious slapping of the cushion as well as a reduction in radiated noise.

Even though automotive inflatable restraint systems are capable of providing vehicle occupants with effective protection from serious injury as a result of collision, discomfort or injury may be caused by both intense sound levels associated with the cushion deployment as well as rapid snapping or whipping of the cushion against the occupant during inflation of the gas cushion, especially near the end of the cushion deployment.

In order to provide effective and timely protection, automotive inflatable restraint cushions must be large (typically 3–20 ft.$^3$ in volume) and the rate of inflation must be great (typically thirty to sixty milliseconds for virtually complete inflation). As a result the bag fabric or other gas-containing means must be deployed at high velocity (typically 100–300 ft./sec.). As a result of these high velocities and short event times, the bag fabric is first rapidly accelerated then rapidly decelerated.

If the deployment of the bag is not uniform, then local rates of acceleration and deceleration may significantly exceed the average values implied by the above.

The manner in which the bag is "folded" or packed can also have considerable effect upon the uniformity of its deployment, thereby affecting the intensity of the noise emitted by the deploying bag. It is the purpose of this discussion to describe a preferred packing or folding means, the result of which is more uniform deployment of the bag(s), with a resultant decrease in annoying or perhaps harmful sound (noise) and, as well, a lessened likelihood of physical injury to the vehicle occupant as a result of fabric-whipping.

In prior cases, the inflatable bag is typically rolled and folded into a package which surrounds the inflating gas manifold. As gas is released into the bag, it breaks a restraining (packaging) means (such as masking tape, light-weight plastic film, etc.). Once the initial restraint is ruptured, the bag(s) is(are) free to expand in response to the inflating jet of gas. Since the inflating gas jet tends to be turbulent (large quantities of gas introduced rapidly), the fabric deployment tends to be erratic. Additionally, rapid local bag accelerations/decelerations are induced in the bag as rolled material reaches full deployment (such as rapid accelerations characterize the motion of the tip of a whip as it reaches the end of its rolling travel).

Objects and advantages of the invention will become apparent in the context of the following more detailed description of the invention.

BRIEF DESCRIPTION OF THE INVENTION

Generally, energy-absorbing and directing means are provided as a part of a passenger restraint cushion, typically to be found within an automobile. The energy-absorbing and directing property is obtained from both the folding of the cushion in its disposition in the automobile before inflation as well as specific restraining means, such as breakable bindings. That fold allows for uniform deployment of the cushion or bag (or bags), the fabric deploying uniformly, playing out from one or more ends.

BRIEF DESCRIPTION OF THE DRAWINGS

The instant invention may be better understood with reference to the following drawings of which.

DETAILED DESCRIPTION OF THE INVENTION

Figure 1:
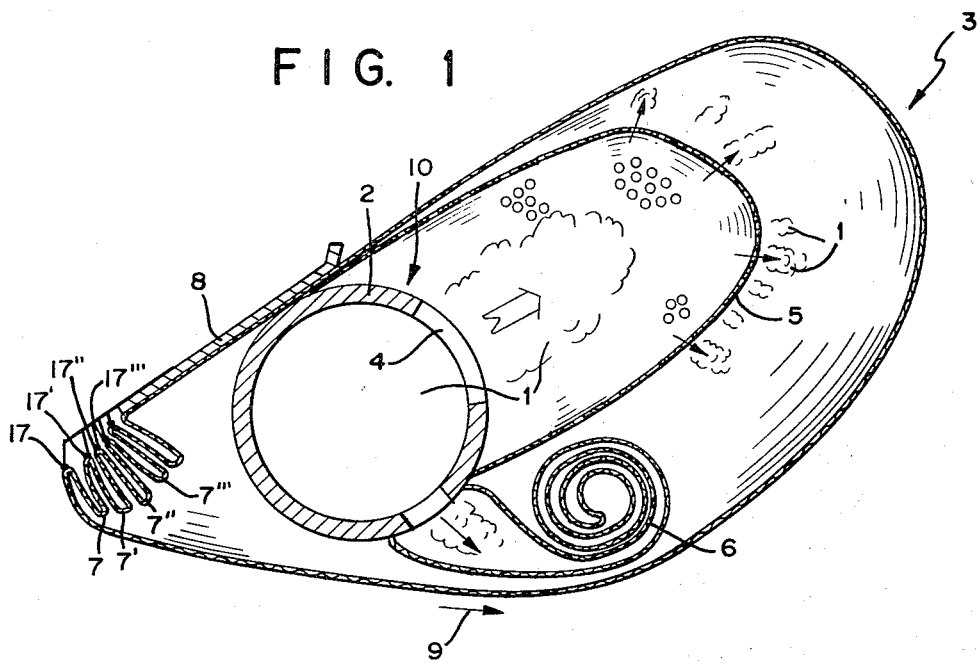
FIG. 1 shows the embodiment of the invention in a folded, ready position.

Turning to FIG. 1, an inflating medium 1 is obtained from a source 10, as is well known in the art. For example, the inflating medium is gas obtained from either a gas generator system or a compressed gas source, or a combination of the two. The inflating medium is directed, at least partially, into a restraining cushioning means, generally indicated at 3. Typically, communication between the source 10 and the cushioning means 3 is through openings 4 in manifold 2. The cushioning means (a bag or bags) 3 comprises an inflatable bag (or bags) folded up in one section thereof into a plurality of flaps, to be described hereinafter.

The bag(s) fabric, or other gas-containing means, envelopes the manifold port(s), slots or other venting means 5, and is packaged on one side or end in a fashion so as to result in controlled, gradual deployment of the fabric. In some automotive inflatable restraint systems there are more than one bag, e.g., in most systems an inner bag 6 is included to provide protection from the occupant's knees and to prevent "torpedoing" during the crash, and a sound reducing screen or bag 4 may also be included, as provided, for example, in U.S. Pat. Ser. No. 230,394, filed Feb. 29, 1972, the assignees P.D. File No. 2000-198. A similar packaging technique may be used for all bags if there are more than one.

The cushioning means 3 is shown with the restraining means folded with flaps as pleats 7, 7', 7'', 7''', folded one on the other and into the bag and against the manifold.

The tip of each pleat is fastened by a breakable binding 17, 17', 17'', 17''' (such as tape or adhesive) to a mounting 8 on the manifold. As the bag is inflated, successive bindings 17, 17', 17'' etc. are broken, each time releasing a small additional amount of fabric, as necessary for containment of the quantity of gas released up to that instant. In this manner, bag fabric motion is largely tangential in some areas, 9, and deployment is uniform, with less local variation, and less free, unrestrained flaps of fabric which are available to slap or fabric-whip an occupant. As a result, sound (noise) which is associated with local bag decelerations/accelerations is significantly reduced.

The formation of a restraining means as a result of the fold is a transitory phenomena. Upon full inflation of the cushioning means 3, the folds or pleats disappear. The cushioning means 3 is entirely without structure, such as a burstable wall, in its interior and is thus internally unoccupied. Inflating gas may thus enter directly into the restraining means without interference thereto.

In one test of the preferred packaging, the bag fabric was brought over a flow restructuring screen and a conventionally rolled inner or knee bag, then multiply-folded upon itself in a series of small pleats. The tip of each pleat was fastened by a breakable binding (tape) to a mounting structure simulating a manifold. As the bag was inflated, successive bindings were broken, each time releasing a small additional amount of fabric, as necessary for containment of the quantity of gas released up to that instant. In this manner, bag fabric motion was largely tangential and deployment was uniform, with less local variation, as well as less free unrestrained flaps of fabric available to slap or fabric-whip an occupant. As a result, sound (noise) which is associated with bag decelerations/accelerations was significantly reduced.

Figure 2:
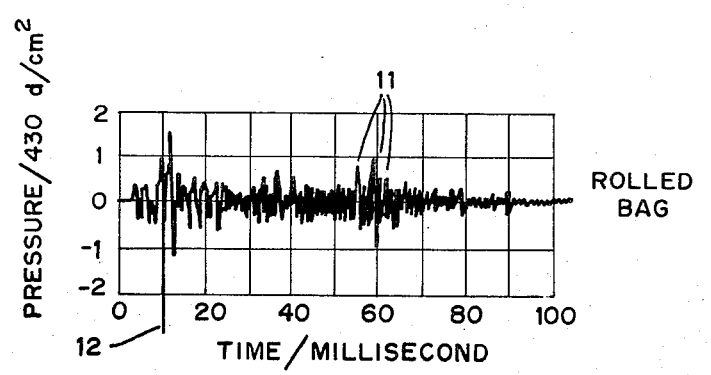
FIGS. 2 and 3 show an indication of benefit gained as a result of employment of the invention.
Figure 3:
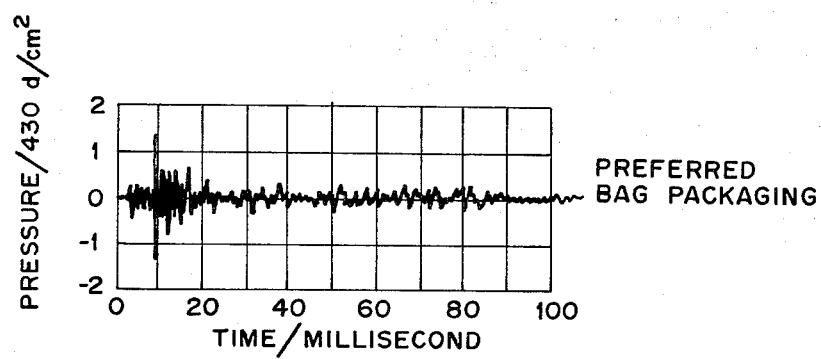

FIG. 2 is a record of the acoustic pressure observed in the frequency band 0.3 to 20 kilohertz using a rolled bag packaging. Large impulses, 12, are associated with fabric snapping as well as packets of noise 11. FIG. 3 is an acoustic record taken under nominally identical conditions as in FIG. 2 except that an additional jet noise suppression screen was used and the bag was folded in the preferred packaging technique. Comparison of FIGS. 4 and 3 shows that there is a particularly noticeable decrease in the noise packet 11 around 60 milliseconds which has been associated with snapping of the bag fabric as it reaches its region of full deployment.

Although the invention has been described with relation to a single illustrated embodiment, it is understood that the invention is only to be limited by the scope of the following claims and not the details of the apparatus, materials, or methods of employing them recited above.

I claim:

1. Safety apparatus for vehicle passengers comprising:
   a. an inflatable restraint;
   b. inflating means for introducing gas directly into said inflatable restraint; and
   c. energy absorbing and directing means including a restraining section forming an integral part of said inflatable restraint, said restraining section comprising a series of pleats, each of said pleats being folded into said inflatable restraint prior to inflation thereof and attached to said inflating means whereby said pleats are released successively during deployment of said inflatable restraint to expand said inflatable restraint in a uniform manner and decrease the sound resultant from said expansion.

2. Safety apparatus in accordance with claim 1, wherein said restraining section is multiply-folded on itself within the inflatable restraint and secured in such position until expansion thereof.

3. Safety apparatus in accordance with claim 1, wherein each of said pleats has a tip attached to said inflating means by a breakable binding.

* * * * *